(12) United States Patent
Wang et al.

(10) Patent No.: US 11,346,487 B2
(45) Date of Patent: May 31, 2022

(54) SUPPORT TOOL AND BACK-PRESSURE GROUTING DEVICE FOR LEAKAGE REPAIR OF INSPECTION WELL AND REPAIR METHOD THEREOF

(71) Applicants: Infrastructure Renewal Institute of Southern China, Guangdong (CN); WELEAD Infrastructure Engineering Technology (Zhengzhou), Ltd., Henan (CN)

(72) Inventors: Fuming Wang, Guangdong (CN); Hongyuan Fang, Guangdong (CN); Peng Zhao, Henan (CN); Yanhui Pan, Henan (CN); Bin Li, Henan (CN); Hang He, Henan (CN)

(73) Assignees: Infrastructure Renewal Institute of Southern China, Guangdong (CN); WELEAD Infrastructure Engineering Technology (Zhengzhou), Ltd., Henan (CN)

( * ) Notice: Subject to any disclaimer, the term of this patent is extended or adjusted under 35 U.S.C. 154(b) by 71 days.

(21) Appl. No.: 16/871,044

(22) Filed: May 11, 2020

(65) Prior Publication Data

US 2020/0271262 A1     Aug. 27, 2020

(30) Foreign Application Priority Data

Sep. 25, 2019   (CN) .......................... 201910912127.3

(51) Int. Cl.
*F16L 55/1645* (2006.01)
*F16L 55/18* (2006.01)

(52) U.S. Cl.
CPC ......... *F16L 55/16455* (2013.01); *F16L 55/18* (2013.01)

(58) Field of Classification Search
CPC ........................... F16L 55/16455; F16L 55/18
USPC .................. 138/97; 405/184.4; 52/126.7
See application file for complete search history.

(56) References Cited

U.S. PATENT DOCUMENTS

| | | | | |
|---|---|---|---|---|
| 2,672,161 A | * | 3/1954 | Brauer | F16L 55/163 138/97 |
| 2,672,162 A | * | 3/1954 | Brauer | F22B 37/104 138/97 |
| 3,830,260 A | * | 8/1974 | Baviello, Sr. | F16L 55/163 138/97 |

(Continued)

*Primary Examiner* — Craig M Schneider
*Assistant Examiner* — David R Deal

(57) ABSTRACT

A support tool for leakage repair of an inspection well includes: a curved loading plate having multiple grouting holes thereon, a telescopic adjustment device, and a base; wherein: one end of the telescopic adjustment device is connected to an inner side face of the curved loading plate, and the other end of the telescopic adjustment device is connected to the base; the telescopic adjustment device adjusts a distance between the curved loading plate and the base. The support tool is firstly hoisted at a leakage position of the inspection well; then a telescopic length of the telescopic adjustment device is adjusted, so that the curved loading plate and the base are in a close contact with opposite sides of the inspection well wall; and a grouting system is used to inject a double-slurry quick-setting repair material into a grouting pipe on the curved loading plate for plugging leakage.

7 Claims, 2 Drawing Sheets

(56) References Cited

U.S. PATENT DOCUMENTS

| | | | | |
|---|---|---|---|---|
| 4,285,368 | A * | 8/1981 | Terrill | F16L 55/124 |
| | | | | 138/89 |
| 4,625,766 | A * | 12/1986 | Dohlen | F16L 55/18 |
| | | | | 138/93 |
| 4,930,542 | A * | 6/1990 | Winkle | E21B 7/30 |
| | | | | 138/97 |
| 5,263,515 | A * | 11/1993 | Goodale | F16L 55/163 |
| | | | | 138/89 |
| 5,819,482 | A * | 10/1998 | Belke | E04C 3/32 |
| | | | | 52/126.6 |
| 6,101,768 | A * | 8/2000 | Springstead | F24F 13/068 |
| | | | | 454/334 |
| 6,505,803 | B1 * | 1/2003 | Hernandez | A47B 51/00 |
| | | | | 248/354.5 |
| 9,027,898 | B1 * | 5/2015 | Holmboe | E21D 15/24 |
| | | | | 248/354.4 |
| 10,288,213 | B1 * | 5/2019 | Harper | B65G 69/2876 |
| 2010/0037537 | A1 * | 2/2010 | Lee | E04G 25/061 |
| | | | | 52/126.6 |

\* cited by examiner

SUPPORT TOOL AND BACK-PRESSURE GROUTING DEVICE FOR LEAKAGE REPAIR OF INSPECTION WELL AND REPAIR METHOD THEREOF

CROSS REFERENCE OF RELATED APPLICATION

The present invention claims priority under 35 U.S.C. 119(a-d) to CN 201910912127.3, filed Sep. 25, 2019.

BACKGROUND OF THE PRESENT INVENTION

Field of Invention

The present invention relates to a technical field of underground drainage pipeline repair, and more particularly to a support tool and a back-pressure grouting device for leakage repair of an inspection well of an underground pipeline, and a repair method thereof.

Description of Related Arts

As the "underground aorta" of modern cities, urban underground drainage pipeline networks bear important responsibilities such as pollution discharge and water drainage. As an important auxiliary structure of municipal pipelines, inspection wells are exclusive channels for inspecting conditions of underground facilities. An interval between adjacent pipeline inspection wells is generally more than 50 m, which is a huge scale. Conventionally, Chinese pipeline inspection wells basically adopt a brick structure. Due to the loose texture of the wall itself, the wall structure is prone to cracks and leakage under external loads such as long-term traffic loads and rainwater immersion, especially in areas with high groundwater levels in the south. Seepage and leakage from inspection wells will cause a large amount of underground fresh water to enter the sewage pipeline, which seriously affects the treatment efficiency of the sewage treatment plant.

Conventional inspection well repair technologies comprise surface repair methods and grouting methods. Surface repair refers to applying a cement coating on the surface of a brick inspection well where damage and leakage have occurred. Such method can repair slight leakage. Based on different injection materials, the grouting method is divided into cement grouting and chemical grouting. Due to the inherent shrinkage properties of cement slurry, secondary cracking and leakage may occur after repair, which cannot cure the leakage disease. Although water-reactive self-expanding chemical grouting materials can effectively plug the leakage, they can be flushed away by water with a relatively high pressure before the reaction is completed. Furthermore, due to the strong expansibility of the material, an inappropriate grouting amount may crack the wall of the inspection well. Therefore, there is an urgent need to develop a rapid and safe repair and reinforcement technology for wall seepage and leakage of the brick inspection well under high groundwater levels.

Conventionally, Chinese patent publication CN105839672, Inspection well connector and inspection well repair method, disclosed an inspection well connector comprising an inner connector and an outer connector, wherein: the inner connector is a hollow circular pipe; the outer connector is sealed with and connected to the inner connector; a reinforcing portion is arranged at a front end of the inner connector, and a grouting hole is provided on the reinforcing portion; and an exhaust pipe is arranged between the outer connector and the reinforcing portion. The invention does not require protective excavation of the inspection well, and can complete the repair of the inspection well in one operation. The technology is simple, the construction is convenient, the construction time is short, and the application range is wide. However, the connector is only suitable for the repair of large-scale leakage in the inspection well. For small-scale or local leakage, it is relatively troublesome, and functions cannot be fully used.

Therefore, it is necessary to develop a rapid repair device and method for local or small-scale seepage and leakage of underground pipeline inspection wells.

SUMMARY OF THE PRESENT INVENTION

In order to solve the above problems, the present invention provides a support tool and a back-pressure grouting device for leakage repair of an inspection well, and a repair method thereof. The support tool is first hoisted at a leakage position of the inspection well, and then a tool such as a wrench is used to adjust a telescopic length of an adjusting nut or an adjusting screw rod, so that a curved loading plate and a base are respectively in a close contact with opposite sides of the inspection well wall. After that, the grouting system is used to inject a double-slurry quick-setting repair material into a grouting pipe on the curved loading plate for plugging leakage, thereby rapidly and safely repairing local leakage and seepage in the brick inspection well of an underground pipeline, and effectively preventing accidents such as crack and collapse of an original structure of the brick inspection well caused by an inappropriate grouting amount during repair processes.

Accordingly, in order to accomplish the above objects, the present invention provides a support tool for leakage repair of an inspection well, comprising:

a curved loading plate having a same inner diameter with the inspection well, wherein a plurality of grouting holes are provided on the curved loading plate;

a telescopic adjustment device; and a base;

wherein: one end of the telescopic adjustment device is connected to an inner side face of the curved loading plate, and the other end of the telescopic adjustment device is connected to the base; the telescopic adjustment device is able to adjust a distance between the curved loading plate and the base.

Preferably, a diameter of each grouting hole is 16 mm.

Preferably, the grouting holes are evenly distributed on the curved loading plate.

Preferably, the telescopic adjustment device comprises a padding plate, an adjusting screw rod and an adjusting nut, wherein: the padding plate is fixed to the inner side face of the curved loading plate; the adjusting nut is fixed to an inner side face of the base; one end of the adjusting screw rod is fixed to the padding plate, and the other end of the adjusting screw rod is connected to the adjusting nut in a threaded connection.

Further preferably, the adjusting nut is welded to the base.

Preferably, the telescopic adjustment device comprises a padding plate, an adjusting screw rod and an adjusting nut, wherein: the padding plate is fixed to the inner side face of the curved loading plate; the adjusting nut is fixed to an inner side face of the base, one end of the adjusting screw rod has a left-hand external thread, and the other end of the adjusting screw rod has a right-hand external thread; the adjusting nut has a left-hand internal thread or a right-hand internal thread; and correspondingly, the padding plate has a right-hand internal thread or a left-hand internal thread.

Preferably, the curved loading plate is made of plastic.

The present invention also provides a back-pressure grouting device for leakage repair of an inspection well, comprising the above support tool for the leakage repair of the inspection well and a grouting system, wherein the grouting system is connected to each grouting hole on the curved loading plate of the support tool through a grouting pipe.

Preferably, the grouting system comprises an air compressor, a first pneumatic diaphragm pump and a second pneumatic diaphragm pump which are both connected to the air compressor through air pipes; the grouting system further comprises a first storage bucket and a second storage bucket, wherein: the first storage bucket is connected to the first pneumatic diaphragm pump through a feeding pipe; and the second storage bucket is connected to the second pneumatic diaphragm pump through a feeding pipe; the grouting system further comprises a grouting proportioning device, wherein discharge ports of the first and second pneumatic diaphragm pumps are both connected to the grouting proportioning device through feeding pipes; a discharge port of the grouting proportioning device is connected to a grouting head through a feeding pipe, and the grouting head is connected to the grouting pipe.

Preferably, the grouting system is arranged on a carrier vehicle or a trailer for injecting repair slurry into the grouting pipe on the curved loading plate through a conveying pipe.

The present invention also provides a repair method for leakage repair of an inspection well, comprising steps of:

S1: hoisting a support tool for the leakage repair of the inspection well to a leakage and seepage position of a wall of the inspection well, wherein construction personnel reach the leakage and seepage position of the wall through a ladder in the inspection well, and cooperate with a hoist to finely adjust the support tool; then rotating an adjusting nut or an adjusting screw rod to extend a telescopic adjustment device, so that a base and a curved loading plate are respectively in a close contact with opposite sides of the inspection well wall, thereby stabilizing the support tool;

S2: drilling a hole into the inspection well wall through a grouting hole preset on the curved loading plate, and inserting a grouting pipe;

S3: injecting a double-slurry quick-setting repair material into a back of the inspection well wall through the grouting pipe with a grouting system, wherein the double-slurry quick-setting repair material quickly flows to a leakage point and reacts to expand and set, thereby plugging leakage and seepage, as well as strengthening soil around the inspection well; and S4: after the double-slurry quick-setting repair material sets, rotating the adjusting nut or the adjusting screw rod to shorten the telescopic adjustment device by the construction personnel, so that the base and the curved loading plate are separated from the opposite sides of the inspection well wall respectively; and hoisting away the support tool.

Preferably, in the step S1, when manually rotating the adjusting nut or the adjusting screw rod, in order to ensure that the support tool is stabilized, it is necessary to use a tool such as a wrench; after the support tool is judged to be well fixed by the construction personnel, it should stop rotating immediately, so as to avoid sliding or breaking a brick material of the inspection well.

Preferably, in the step S2, a drill having a same diameter with the grouting hole is selected for drilling, so as to prevent damaging the curved loading plate.

Preferably, in the step S3, when grouting to the inspection well wall through the grouting pipe, a required slurry amount should be calculated in advance and distributed evenly to each grouting pipe, in such a manner that an injection time will not be too long to make the slurry set and block other grouting pipes, and an entire grouting process is compact and orderly.

Preferably, in the step S3, the double-slurry quick-setting repair material comprises a main agent and a setting agent with a weight ratio of 2:1-1:1;

the main agent comprises raw materials in parts by weight of: 50-160 parts of isocyanate and 20-100 parts of a chlorophosphate mixture with a density larger than 1400 kg/m$^3$, wherein a weight ratio of the isocyanate and the chlorophosphate mixture is 1:1-4:1; and the setting agent comprises raw materials in parts by weight of: 30-60 parts of the chlorophosphate mixture with the density larger than 1400 kg/m$^3$; 5-15 parts of propyl formate, methyl propionate or a mixture thereof; 15-55 parts of polyhydric alcohol; 1-3 parts of a surfactant; 2-6 parts of a catalyst; 0-0.5 parts of water; and 0-1 part of color paste.

Preferably, in the step S3, the curved loading plate has a plurality of grouting holes thereon, and the double-slurry quick-setting repair material is injected to the inspection well wall successively through the grouting holes with the grouting system.

The main agent and the setting agent of the double-slurry quick-setting repair material are respectively stored in the first storage bucket and the second storage bucket.

With the foregoing technical solutions, the present invention has beneficial effects as follows.

Firstly, according to the present invention, the support tool for the leakage repair of the inspection well comprises the curved loading plate having the same inner diameter with the inspection well, the telescopic adjustment device and the base. The telescopic adjustment device is arranged between the curved loading plate and the base, and can adjust the distance between the curved loading plate and the base. The structure is simple to use. When using, only the telescopic adjustment device needs to be adjusted, so that the curved loading plate and the base are in the close contact with the opposite sides of the inspection well wall for supporting.

Secondly, the telescopic adjustment device of the present invention adjusts the adjusting nut or the adjusting screw rod for telescopic adjustment, which has a simple structure and low processing and manufacturing costs.

Thirdly, the present invention uses the double-slurry quick-setting repair material to rapidly plug the leakage and the seepage, and strengthen the soil around the pipeline inspection well, which solves the problem that the conventional water-reactive grouting material will be flushed away before the reaction is completed when the water amount of the leakage and the seepage is too large.

Fourthly, the present invention adopts the support tool as an auxiliary tool for inspection well repair, and the curved loading plate is provided with the grouting holes thereon. The grouting system injects the double-slurry quick-setting repair material into the leakage point of the inspection well through the grouting pipe. The stable support of the curved loading plate enables the injected double-slurry quick-setting repair material to rapidly flow to the leakage point and set for repairing and plugging the leakage point, which effectively prevents accidents such as crack and collapse of an original structure of the brick inspection well caused by the inappropriate grouting amount during repair processes. Compared with the conventional grouting repair method, the present invention has advantages of a good construction safety, a good repair effect, and no secondary disaster.

Fifthly, the curved loading plate of the present invention is provided with a plurality of grouting holes thereon, and the grouting holes are evenly distributed on the curved loading plate. During the repair processes, holes are drilled into the inspection well wall through the grouting holes preset on the curved loading plate, and grouting pipes are inserted into the grouting holes; then the double-slurry quick-setting repair material is injected into the leakage point through the grouting pipes. The operation is simple and the double-slurry quick-setting repair material rapidly sets, so that the repair efficiency for the leakage repair of the inspection well is improved.

BRIEF DESCRIPTION OF THE DRAWINGS

In order to more clearly explain the embodiments of the present invention or the technical solutions in the prior art, the drawings used in the description of the embodiments or the prior art will be briefly introduced below. Obviously, the drawings in the following description are merely some embodiments of the present invention. For those of ordinary skill in the art, other drawings can be obtained based on the drawings without the creative efforts.

In figures: 1: curved loading plate; 11: grouting hole; 2: telescopic adjustment device; 21: padding plate; 22: adjusting screw rod; 23: adjusting nut; 3: base; 4: grouting pipe; 5: inspection well; 6: grouting system; 7: second storage bucket; 8: first storage bucket; 9: air compressor; 10: feeding pipe; 15: first pneumatic diaphragm pump; 16: second pneumatic diaphragm pump; 17: air pipe; 27: grouting proportioning device; and 28: grouting head.

DETAILED DESCRIPTION OF THE PREFERRED EMBODIMENT

Technical solutions in the preferred embodiments of the present invention will be clearly and completely described as follows with the accompanying drawings. Obviously, the described preferred embodiments are only a part of embodiments of the present invention, not all of the embodiments. Other embodiments obtained by those of ordinary skill in the art based on the preferred embodiments of the present invention without the creative efforts should be all encompassed in the protection scope of the present invention.

The present invention is further illustrated with the accompanying drawings as follows.

First Preferred Embodiment

Figure 1:
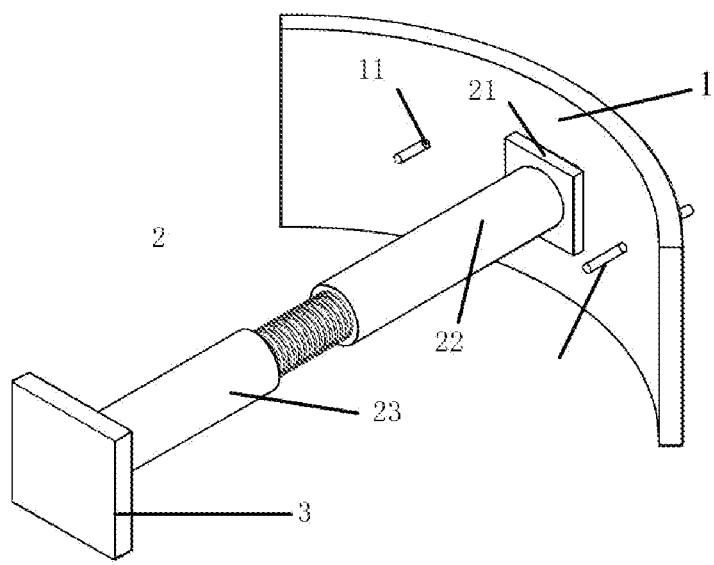
FIG. 1 is a perspective view of a support tool for leakage repair of an inspection well according to the present invention.
Figure 2:
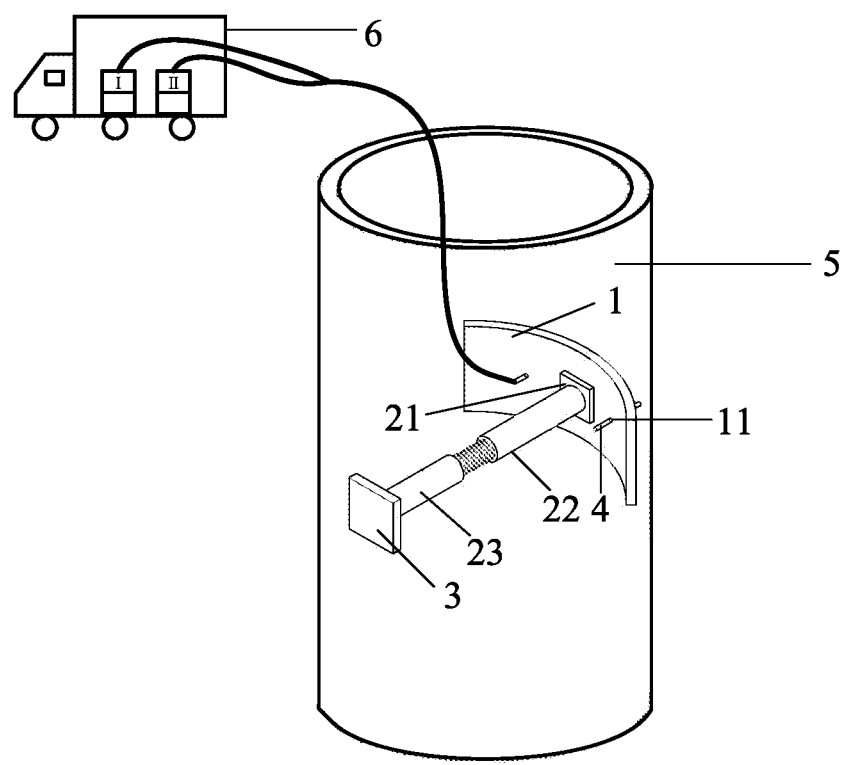
FIG. 2 is a perspective view of a back-pressure grouting device for the leakage repair of the inspection well according to the present invention.

Referring to FIG. 1 and FIG. 2, the present invention provides a support tool for leakage repair of an inspection well, comprising:

a curved loading plate 1 having a same inner diameter with the inspection well 5, wherein a plurality of grouting holes 11 are provided on the curved loading plate 1;

a telescopic adjustment device 2; and a base 3;

wherein: one end of the telescopic adjustment device 2 is connected to an inner side face of the curved loading plate 1, and the other end of the telescopic adjustment device 2 is connected to the base 3; the telescopic adjustment device 2 is able to adjust a distance between the curved loading plate 1 and the base 3.

Furthermore, for rapidly injecting to a leakage point, a diameter of each grouting hole 11 is 16 mm.

Furthermore, referring to FIG. 1 and FIG. 2, the grouting holes 11 are evenly distributed on the curved loading plate 1. In the first preferred embodiment, two grouting holes 11 are provided on the curved loading plate 1 with an interval of 30 cm, which are respectively at two sides of the telescopic adjustment device 2, so as to facilitate uniform injection of a grouting system.

Furthermore, referring to FIG. 1, the telescopic adjustment device 2 comprises a padding plate 21, an adjusting screw rod 22 and an adjusting nut 23, wherein: the padding plate 21 is fixed to the inner side face of the curved loading plate 1; the adjusting nut 23 is fixed to an inner side face of the base 3; one end of the adjusting screw rod 22 is fixed to the padding plate 21, and the other end of the adjusting screw rod 22 is connected to the adjusting nut 23 in a threaded connection. When using, the distance between the curved loading plate 1 and the base 3 can be adjusted through rotating the adjusting nut 23 only.

Furthermore, referring to FIG. 1, the adjusting nut 23 is welded to the base 3.

Second Preferred Embodiment

The telescopic adjustment device 2 comprises a padding plate 21, an adjusting screw rod 22 and an adjusting nut 23, wherein: the padding plate 21 is fixed to the inner side face of the curved loading plate 1; the adjusting nut 23 is fixed to an inner side face of the base 3; one end of the adjusting screw rod 22 has a left-hand external thread, and the other end of the adjusting screw rod 22 has a right-hand external thread; the adjusting nut 23 has a left-hand internal thread or a right-hand internal thread; and correspondingly, the padding plate 21 has a right-hand internal thread or a left-hand internal thread. When using, the distance between the curved loading plate 1 and the base 3 can be adjusted through rotating the adjusting screw rod 22.

Furthermore, in order to facilitate processing and manufacturing, and separation from the repair material, the curved loading plate 1 is made of plastic.

It should be noted that: no matter in the first preferred embodiment or in the second preferred embodiment, the size of the curved loading plate 1 can be adjusted according to sizes or density of the leakage points in the inspection well 5. Correspondingly, the quantity and the positions of the grouting holes 11 provided on the curved loading plate 1 can be adjusted according to the implementation situations, so as to ensure that the double-slurry quick-setting repair material can effectively diffuse and plug the leakage behind the brick inspection well wall.

Third Preferred Embodiment

Referring to FIG. 2, the present invention further provides a back-pressure grouting device for leakage repair of an inspection well, comprising the support tool in the first or second preferred embodiment, and a grouting system 6, wherein the grouting system 6 is connected to each grouting hole 11 on the curved loading plate 1 of the support tool through a grouting pipe 4.

Figure 3:
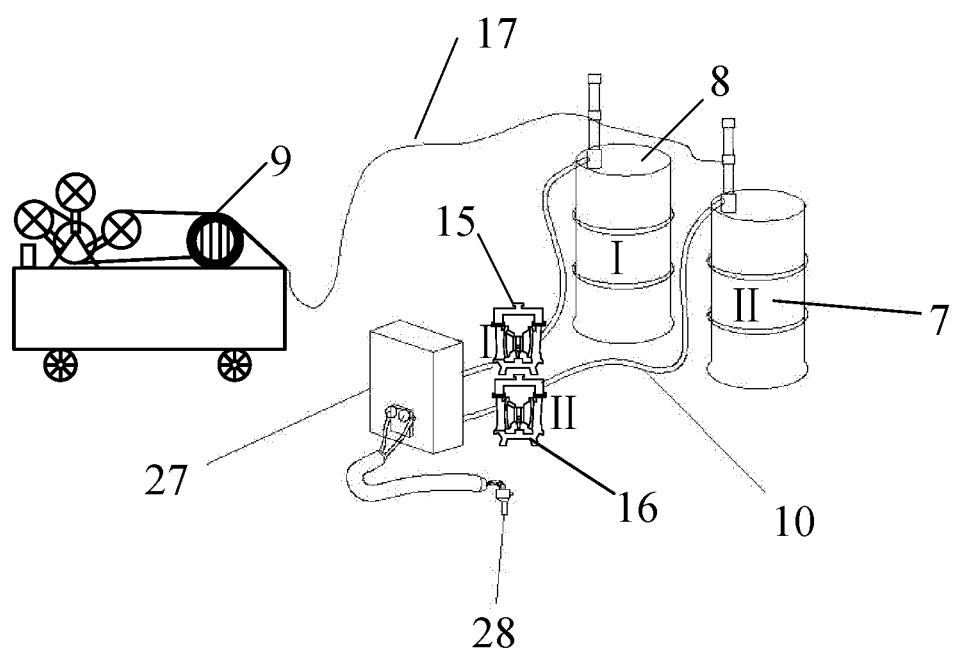
FIG. 3 is a sketch view of a grouting system according to the present invention.

Furthermore, as shown in FIG. 3, the grouting system 6 comprises an air compressor 9, a first pneumatic diaphragm pump 15 and a second pneumatic diaphragm pump 16 which are both connected to the air compressor 9 through air pipes 17; the grouting system 6 further comprises a first storage bucket 8 and a second storage bucket 7, wherein: the first storage bucket 8 is connected to the first pneumatic diaphragm pump 15 through a feeding pipe 10; and the second storage bucket 7 is connected to the second pneumatic diaphragm pump 16 through a feeding pipe 10; the grouting system 6 further comprises a grouting proportioning device 27, wherein discharge ports of the first and second pneumatic diaphragm pumps, 15 and 16, are both connected to the grouting proportioning device 27 through feeding pipes 10; a discharge port of the grouting proportioning device 27 is connected to a grouting head 28 through a feeding pipe 10, and the grouting head 28 is connected to the grouting pipe 4.

Furthermore, the grouting system 6 is arranged on a carrier vehicle or a trailer for injecting the repair slurry into the grouting pipe 4 on the curved loading plate 1 through a conveying pipe. The repair slurry will rapidly flow to the leakage point under a pressure of the grouting system 6.

The present invention further provides a repair method for leakage repair of an inspection well with the back-pressure grouting device, comprising steps of:

S1: hoisting a support tool in the first or second preferred embodiment to a leakage and seepage position of a wall of the inspection well 5, wherein construction personnel reach the leakage and seepage position of the wall through a ladder in the inspection well 5, and cooperate with a hoist to finely adjust the support tool in the first or second preferred embodiment; then rotating an adjusting nut 23 or an adjusting screw rod 22 to extend a telescopic adjustment device 2, so that a base 3 and a curved loading plate 1 are respectively in a close contact with opposite sides of the inspection well wall, thereby stabilizing the support tool in the first or second preferred embodiment;

S2: drilling a hole into the inspection well wall through a grouting hole 11 preset on the curved loading plate 1, and inserting a grouting pipe 4;

S3: injecting a double-slurry quick-setting repair material into a back of the wall of the inspection well 5 through the grouting pipe 4 with a grouting system 6, wherein the double-slurry quick-setting repair material quickly flows to a leakage point and reacts to expand and set, thereby plugging leakage and seepage, as well as strengthening soil around the inspection well 5; and S4: after the double-slurry quick-setting repair material sets, rotating the adjusting nut 23 or the adjusting screw rod 22 to shorten the telescopic adjustment device 2 by the construction personnel, so that the base 3 and the curved loading plate 1 are separated from the opposite sides of the inspection well wall respectively; and hoisting away the support tool in the first or second preferred embodiment.

Furthermore, in the step S1, when manually rotating the adjusting nut 23 or the adjusting screw rod 22, in order to ensure that the support tool in the first or second preferred embodiment is stabilized, it is necessary to use a tool such as a wrench; after the support tool in the first or second preferred embodiment is judged to be well fixed by the construction personnel, it should stop rotating the adjusting nut 23 or the adjusting screw rod 22 immediately, so as to avoid sliding or breaking a brick material of the inspection well.

Furthermore, in the step S2, a drill having a same diameter with the grouting hole 11 is selected for drilling, so as to prevent damaging the curved loading plate 1.

Furthermore, in the step S3, when grouting to the inspection well wall through the grouting pipe 4, a required slurry amount should be calculated in advance and distributed evenly to each grouting pipe 4, in such a manner that an injection time will not be too long to make the slurry set and block other grouting pipes 4, and an entire grouting process is compact and orderly.

Furthermore, in the step S3, the double-slurry quick-setting repair material comprises a main agent and a setting agent with a weight ratio of 2:1-1:1;

the main agent comprises raw materials in parts by weight of: 50-160 parts of isocyanate and 20-100 parts of a chlorophosphate mixture with a density larger than 1400 kg/m$^3$, wherein a weight ratio of the isocyanate and the chlorophosphate mixture is 1:1-4:1; and the setting agent comprises raw materials in parts by weight of: 30-60 parts of the chlorophosphate mixture with the density larger than 1400 kg/m$^3$; 5-15 parts of propyl formate, methyl propionate or a mixture thereof; 15-55 parts of polyhydric alcohol; 1-3 parts of a surfactant; 2-6 parts of a catalyst; 0-0.5 parts of water; and 0-1 part of color paste.

Furthermore, in the step S3, the curved loading plate 1 has a plurality of grouting holes 11 thereon, and the double-slurry quick-setting repair material is injected to the wall of the inspection well 5 successively through the grouting holes 11 with the grouting system 6, so as to ensure that the double-slurry quick-setting repair material effectively diffuses to every leakage point.

The main agent and the setting agent of the double-slurry quick-setting repair material are respectively stored in the first storage bucket 8 and the second storage bucket 7.

The repair process of the present invention is directed to the rapid repair problem of leakage and seepage in the brick inspection wells of the underground pipeline with the high groundwater level, which can rapidly repair the leakage and seepage in the brick inspection wells of the underground pipeline with the high groundwater level through grouting and strengthening. The present invention uses the double-slurry quick-setting repair material to rapidly plug the leakage and strengthen the soil around the pipeline inspection well 5, which solves the problem that the conventional water-reactive grouting material will be flushed away before the reaction is completed when the leakage water amount is too large. The present invention also effectively prevents accidents such as crack and collapse of an original structure of a brick inspection well caused by an inappropriate grouting amount during repair processes. Compared with the conventional grouting repair method, the present invention has advantages of a good construction safety, a good repair effect, and no secondary disaster, which promotes the Chinese underground pipeline maintenance technology. The support tool provided by the present invention can rapidly and conveniently repair the local leakage in the inspection well. For the large-scale leakage repair, only a volume of the curved loading plate 1 needs to be increased, so as to increase a contact area with the wall of the inspection well 5. For the multi-point repair in the same inspection well 5, only the support tool provided by the present invention needs to be rotated to the leakage point position where a hole is drilled correspondingly. The repair efficiency of the whole inspection well 5 can be improved by repeating the above repair steps.

The above-mentioned is a detailed illustration of the present invention. Specific embodiments have been used herein to explain the principles and implementation of the present invention. The description of the above preferred embodiments is only used to help understand the method and the core spirit of the present invention. It should be noted that: for those of ordinary skill in the art, without departing from the principle of the present invention, various improvements and modifications can be made to the present invention, which are all encompassed in the protection scope of the claims of the present invention.

What is claimed is:

1. A support tool for leakage repair of an inspection well, comprising:
    a curved loading plate having a same inner diameter with the inspection well, wherein a plurality of grouting holes are provided on the curved loading plate;
    a base; and
    a telescopic adjustment device, comprising a padding plate, an adjusting screw rod and an adjusting nut, wherein: the padding plate is fixed to an inner side face of the curved loading plate; and the adjusting nut is fixed to an inner side face of the base;
    wherein: one end of the telescopic adjustment device is connected to the inner side face of the curved loading plate, and the other end of the telescopic adjustment device is connected to the base, the telescopic adjustment device is able to adjust a distance between the curved loading plate and the base;
    wherein: one end of the adjusting screw rod has a left-hand external thread, and the other end of the adjusting screw rod has a right-hand external thread; the adjusting nut has a left-hand internal thread or a right-hand internal thread; correspondingly, the padding plate has a right-hand internal thread or a left-hand internal thread.

2. A back-pressure grouting device for leakage repair of an inspection well, comprising: a support tool for the leakage repair of the inspection well as recited in claim 1, and a grouting system, wherein the grouting system is connected to a grouting hole on a curved loading plate of the support tool through a grouting pipe.

3. The back-pressure grouting device, as recited in claim 2, wherein the grouting system comprises an air compressor, a first pneumatic diaphragm pump and a second pneumatic diaphragm pump which are both connected to the air compressor through air pipes; the grouting system further comprises a first storage bucket and a second storage bucket, wherein the first storage bucket is connected to the first pneumatic diaphragm pump through a feeding pipe, and the second storage bucket is connected to the second pneumatic diaphragm pump through a feeding pipe; the grouting system further comprises a grouting proportioning device, wherein discharge ports of the first and second pneumatic diaphragm pumps are both connected to the grouting proportioning device through feeding pipes; a discharge port of the grouting proportioning device is connected to a grouting head through a feeding pipe, and the grouting head is connected to the grouting pipe.

4. A repair method for leakage repair of an inspection well, comprising steps of:
    S1: hoisting a support tool for the leakage repair of the inspection well to a leakage and seepage position of a wall of the inspection well, wherein construction personnel reach the leakage and seepage position of the wall through a ladder in the inspection well, and cooperate with a hoist to finely adjust the support tool; then rotating an adjusting nut or an adjusting screw rod to extend a telescopic adjustment device, so that a base and a curved loading plate are respectively in a close contact with opposite sides of the inspection well wall, thereby stabilizing the support tool;
    S2: drilling a hole into the inspection well wall through a grouting hole preset on the curved loading plate, and inserting a grouting pipe;
    S3: injecting a double-slurry quick-setting repair material into a back of the inspection well wall through the grouting pipe with a grouting system, wherein the double-slurry quick-setting repair material quickly flows to a leakage point and reacts to expand and set, thereby plugging leakage and seepage, as well as strengthening soil around the inspection well; and
    S4: after the double-slurry quick-setting repair material sets, rotating the adjusting nut or the adjusting screw rod to shorten the telescopic adjustment device by the construction personnel, so that the base and the curved loading plate are separated from the opposite sides of the inspection well wall respectively; and hoisting away the support tool.

5. The repair method, as recited in claim 4, wherein: in the step S3, the double-slurry quick-setting repair material comprises a main agent and a setting agent with a weight ratio of 2:1-1:1;
    the main agent comprises raw materials in parts by weight of: 50-160 parts of isocyanate and 20-100 parts of a chlorophosphate mixture with a density larger than 1400 kg/m$^3$, wherein a weight ratio of the isocyanate and the chlorophosphate mixture is 1:1-4:1; and
    the setting agent comprises raw materials in parts by weight of: 30-60 parts of the chlorophosphate mixture with the density larger than 1400 kg/m$^3$; 5-15 parts of propyl formate, methyl propionate or a mixture thereof; 15-55 parts of polyhydric alcohol; 1-3 parts of a surfactant; 2-6 parts of a catalyst; 0-0.5 parts of water; and 0-1 part of color paste.

6. The repair method, as recited in claim 5, wherein in the step S3, the curved loading plate has a plurality of grouting holes thereon, and the double-slurry quick-setting repair material is injected to the inspection well wall successively through the grouting holes with the grouting system.

7. The repair method, as recited in claim 4, wherein in the step S3, the curved loading plate has a plurality of grouting holes thereon, and the double-slurry quick-setting repair material is injected to the inspection well wall successively through the grouting holes with the grouting system.

* * * * *